(12) United States Patent
Chiang

(10) Patent No.: US 7,911,579 B2
(45) Date of Patent: Mar. 22, 2011

(54) ARRANGEMENT OF PHOTO SPACER MATERIAL

(75) Inventor: Min-Feng Chiang, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/638,716

(22) Filed: Dec. 15, 2009

(65) Prior Publication Data

US 2010/0091235 A1 Apr. 15, 2010

Related U.S. Application Data

(63) Continuation of application No. 11/270,576, filed on Nov. 10, 2005, now Pat. No. 7,663,729.

(30) Foreign Application Priority Data

Jul. 20, 2005 (TW) .............................. 94124561 A

(51) Int. Cl.
*G02F 1/1339* (2006.01)
(52) U.S. Cl. ....................................... 349/156; 349/155

(58) Field of Classification Search ........... 349/155–156
See application file for complete search history.

(56) References Cited

U.S. PATENT DOCUMENTS

2007/0121051 A1 * 5/2007 Yokoyama et al. ........... 349/156

FOREIGN PATENT DOCUMENTS

WO WO2005/038518 * 4/2005

\* cited by examiner

*Primary Examiner* — David Nelms
*Assistant Examiner* — Phu Vu
(74) *Attorney, Agent, or Firm* — WPAT, P.C.; Anthony King

(57) ABSTRACT

This invention discloses a photo spacer material arrangement method. The method is used for a flat display apparatus that comprises at least one photo spacer, a panel, and a substrate. The photo spacer material provides a fixed distance between the panel and the substrate. The photo spacer material arrangement method comprises providing an area unit composed of N×N sub-area units with multiple columns and multiple rows. In order to provide P photo spacers for uniform distributing on sub-area units with an arrangement mode, there is only one photo spacer in each column, and there is only one photo spacer in each row in sub-area units.

8 Claims, 11 Drawing Sheets

81

82

83

84

ARRANGEMENT OF PHOTO SPACER MATERIAL

CROSS-REFERENCE TO RELATED APPLICATIONS

This application claims priority to, and is a Continuation Application of, U.S. application Ser. No. 11/270,576, filed on Nov. 10, 2005, now pending, which claims priority from Taiwan Patent Application No. 094124561, filed on Jul. 20, 2005, which are hereby incorporated by reference in their entirety. Although incorporated by references in their entirety, no arguments or disclaimers made in the parent applications apply to this continuation application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

FIELD OF THE INVENTION

The present invention generally relates to a method for arranging photo spacers. More particularly relates to use an arrangement mode in a flat display apparatus that photo spacers can be uniform distributed between panels and substrates.

BACKGROUND OF THE INVENTION

Under the tendency of seeking high brightness and high comparison for flat display apparatuses, the photo spacer material is applied for closing and supporting between color filters and substrates that plays an important role. Crystal cells are formed by photo spacers that will affect an orientation of crystal cells. Referring to FIG. 1, a sectional drawing of a flat panel apparatus by using spherical spacer materials is illustrated. The flat panel apparatus comprises a color filter 11, a glass substrate 12, and at least one spherical spacer CS, wherein the spherical spacer CS is used for closing and supporting between the color filter 11 and the glass substrate 12. Disadvantages of spherical spacer materials include light leaks, low transmittance, low contrast, low mechanical strength and low displacement that increase bad pixels of the flat panel apparatus.

Therefore, in order to control the fluidity in the crystal cell, the quantity and the uniformity for photo spacers in the crystal cell will be an important issue. In addition, the dimensional stability in heating of photo spacers will also influence the thickness of the crystal cell. Accordingly, a cylindrical polymer to be a newly photo spacer has been developed. Referring to FIG. 2, a sectional drawing of a flat panel apparatus by using cylindrical photo spacers is illustrated. The flat display apparatus comprises a color filter 11, a glass substrate 12 and at least one photo spacer PS, wherein the photo spacer PS is cylinder and is used for closing and supporting between the color filter 11 and the glass substrate 12. The polymer material has better adhesion, heat-resistant, and high transmittance. To compare with spherical spacers, there are no low mechanical strength, light leaks, and low fluidity on cylindrical photo spacers.

Traditionally, spherical spacers can be set by spraying that is unable to fix on the glass substrate and the distribution location is unable to control completely. However, cylindrical photo spacers can be made on the glass substrate by utilizing photo lithography that does not only fix distance, but also modifies intervals by utilizing the thickness of photo spacer materials that provides a smoother supporting for panels, reduces process, and increases aperture ratio.

Currently, there is no certain rule to provide engineers to follow that arrange photo spacers randomly. Referring to FIG. 3, a schematic diagram of setting locations of two conventional photo spacers is illustrated. An area unit can be formed by 5×5 to set five photo spacers PS that produces setting locations of photo spacers easily as arrangement modes 31, 32. Referring to FIG. 4, a schematic diagram of arranging the location repeatedly according to FIG. 3 is illustrated. The area unit is arranged repeatedly by arrangement modes 31, 32 that photo spacers PS will be unable to uniform distribute. For example, the circle area 41 is a highly concentrated of photo spacers PS and the circle area 42 is sparse that still produces bad pixels. There must be some ways to resolve disadvantages of the mentioned above by providing a method for photo spacer arrangement.

SUMMARY OF THE INVENTION

Briefly, the primary object of the present invention is to disclose a method for photo spacer material arrangement that is used in a flat display apparatus. The flat display apparatus at least comprises at least one photo spacer material, a panel, and a substrate. The photo spacer provides a fixed distance between the panel and the substrate. The method for photo spacer material arrangement comprises allocating an area unit composed of N×N sub-area units with multiple columns and multiple rows and in an arrangement mode, providing P photo spacers that is uniformly distributed on the N×N sub-area units. Meanwhile, there is only one photo spacer in each column, and there is only one photo space in each row. In addition, the area unit is allocated repeatedly by the way of the mentioned above to fill on the panel. N and P are positive integers and N equals P.

The second object of the present invention is to disclose another method for arranging photo spacer. The method comprises providing a displacement parameter to be x column sub-area unit. First, a first location is determined as the predetermined location in the first column, first row of the area units. Second, a second location is calculated, displacing the first location vertically to second row to be a start location, displacing x column sub-area with same row horizontally from the start location to be the second location, continues to calculate a n location, displacing a n−1 location vertically to n row to be a start location, displacing x column sub-area unit with same row horizontally from the start location to be n location, wherein if the x column sub-area unit is greater than remaining columns of the row, continues calculating from first column of the row. In addition, the displacement parameter of the mentioned above further comprises providing any corresponding integers to be co-prime with N and/or 1 that integers are also not greater than N in order to be x column sub-area unit. Meanwhile, the method further includes arranging the area unit repeatedly at four quadrant locations and providing a selection unit of equaling the area unit, wherein the selection unit is selected from the repeated four quadrant locations in order to be the arrangement mode of the photo spacers. Moreover, the selection unit is arranged repeatedly to fill on the panel. N and P are positive integers and N equals P.

DETAILED DESCRIPTION OF THE PREFERRED EMBODIMENTS

To make it easier for our examiner to understand the objective of the invention, its innovative features and performance, a detailed description and technical characteristics of the present invention are described together with the drawings as follows.

The present invention discloses a method for arranging photo spacer that is used in a flat display apparatus. The flat display apparatus at least comprises a photo spacer, a panel, and a substrate. The photo spacer is set between the panel and the substrate to provide a fixed distance. The method is to allocate an area unit composed of N×N sub-area units with multiple columns and multiple rows. P photo spacers are set by an arrangement mode on the area unit, wherein P equals N. The area unit is arranged repeatedly based on the arrangement mode, so as to fill on the panel. The size of photo spacer materials of the mentioned above has to be considered that sub-area units need to keep a certain transmittance; hence the size of photo spacers is smaller than sub-area units. In the preferred embodiment, sub-area units set from photo spacer materials will be marked to be an arrangement mode. The illustration will be only focused on the area unit as N=3, 4, 5, 6, and 7, other numeric can be accomplished according to the concept in the present invention.

Figure 1:
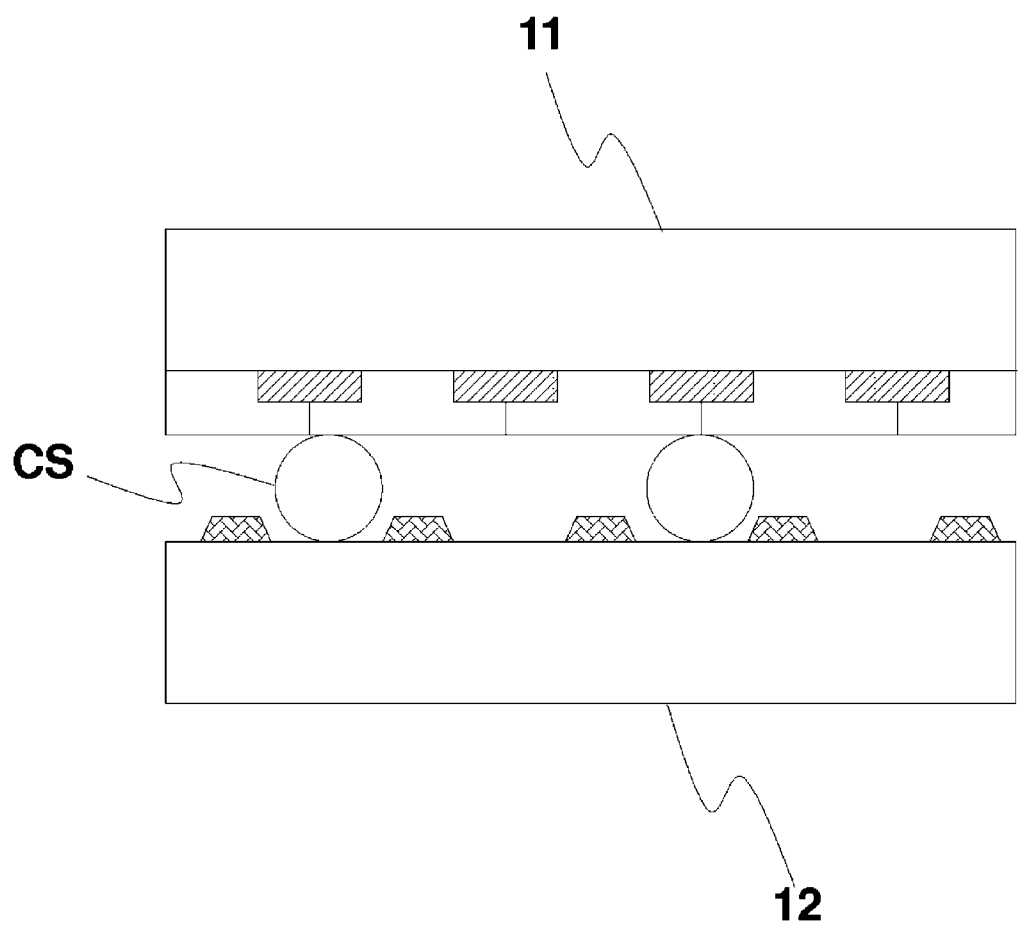
FIG. 1 is a sectional drawing of a flat panel apparatus by using spherical spacer materials.
Figure 2:
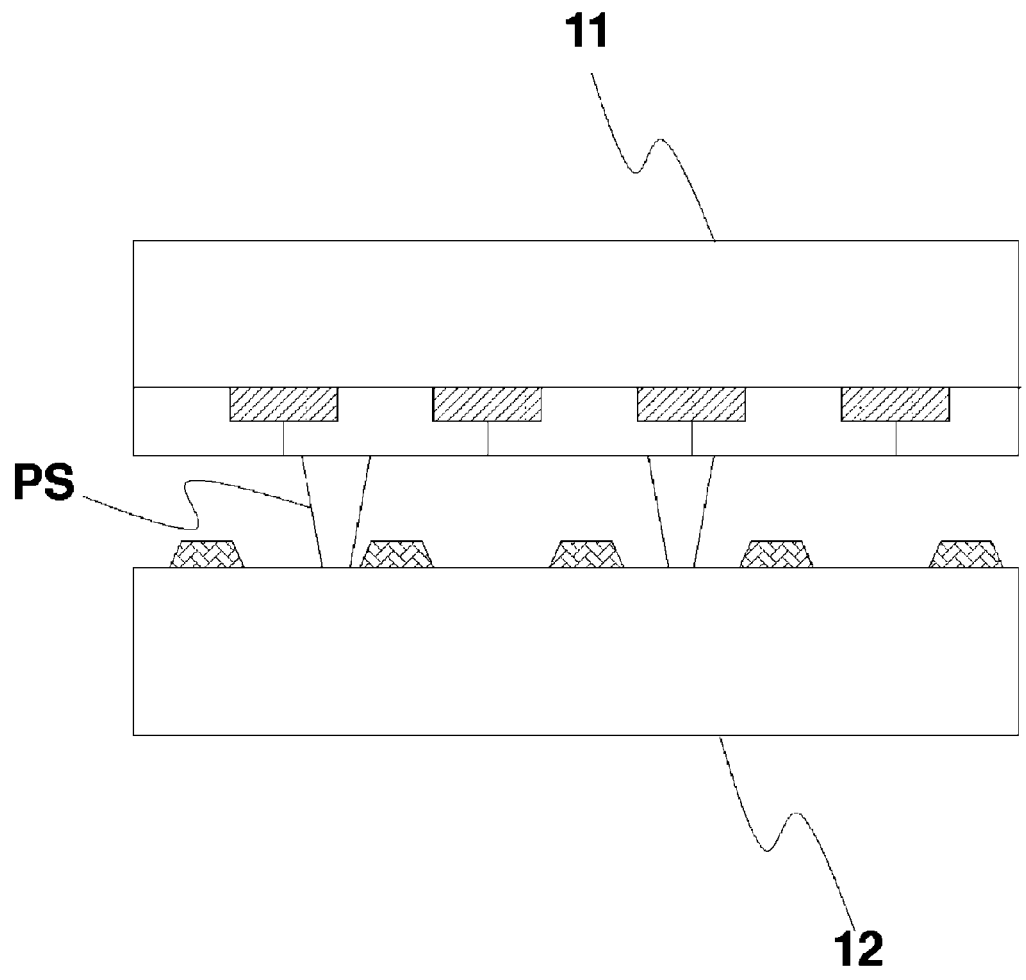
FIG. 2 is a sectional drawing of a flat panel apparatus by using cylindrical photo spacer materials.
Figure 3:
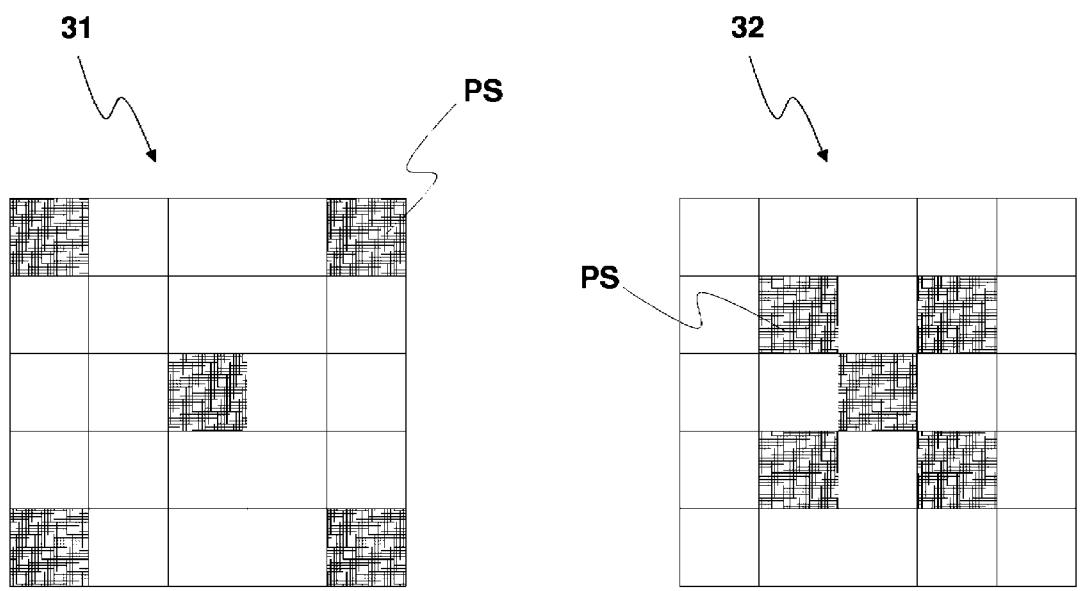
FIG. 3 is a schematic diagram of setting locations of two conventional photo spacers.
Figure 4:
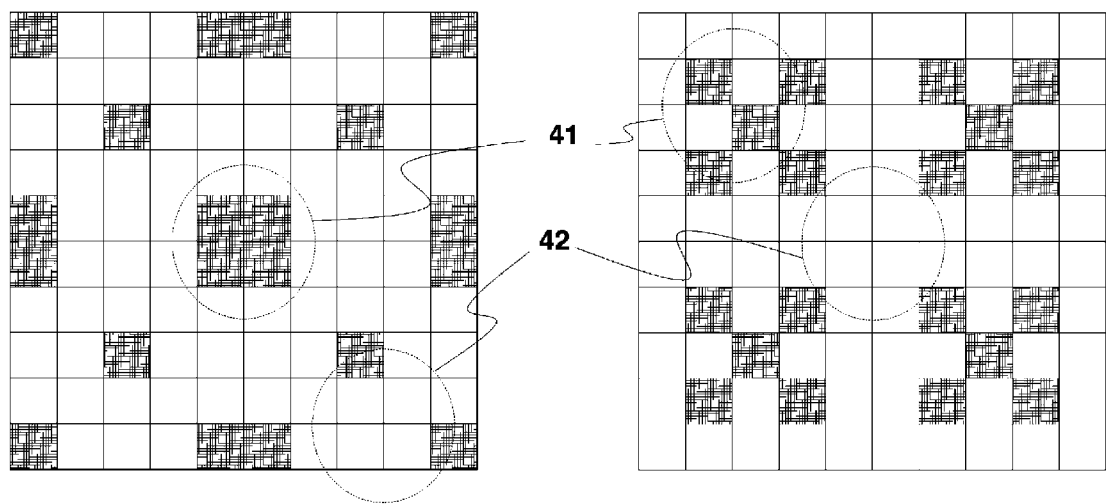
FIG. 4 is a schematic diagram of arranging the location repeatedly according to FIG. 3.
Figure 5:
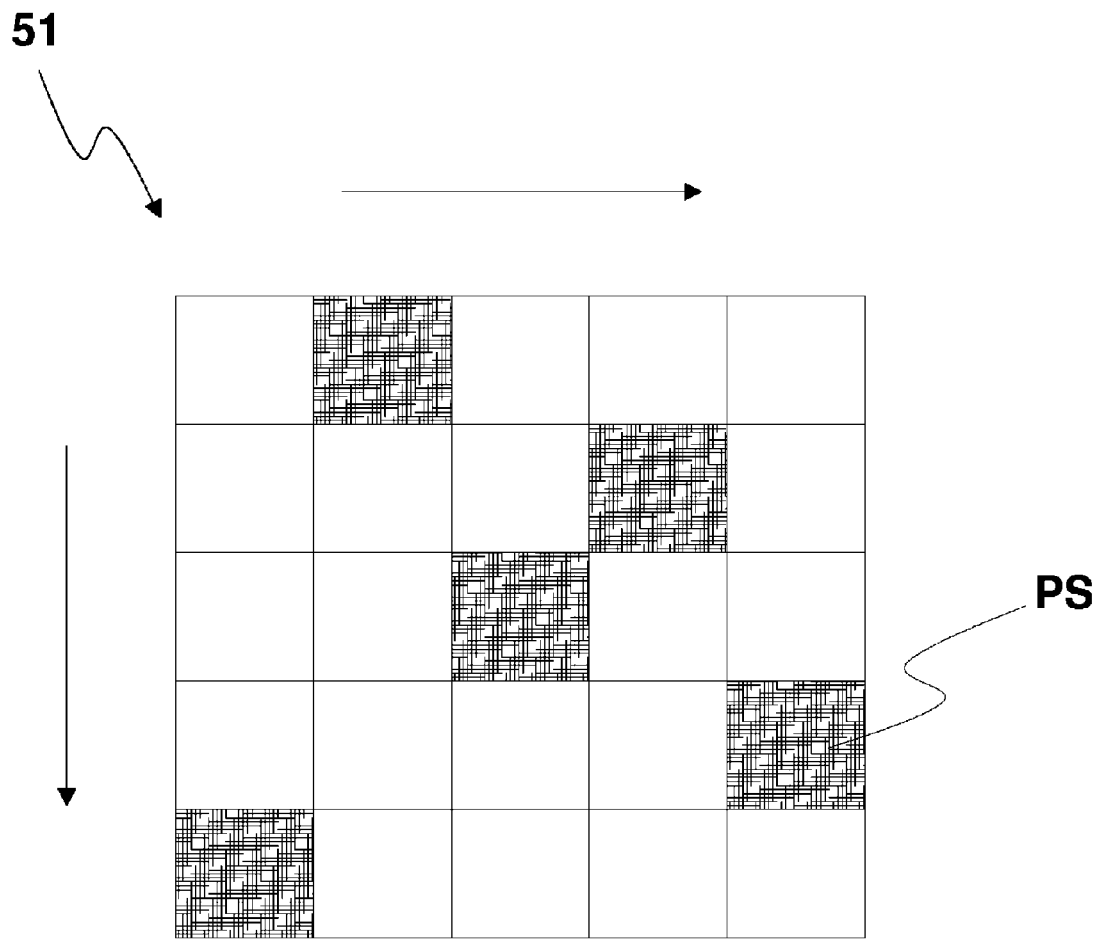
FIG. 5 is a schematic diagram of an example of an area unit of N=5 according to an embodiment of the present invention.

Referring to FIG. 5, a schematic diagram of an example of an area unit of N=5 according to an embodiment of the present invention is illustrated. An arrangement mode 51 can be an area unit of N=5 and provides five photo spacers PS in order to set on the area unit, wherein five photo spacers PS can be set respectively at first column first row, second column fourth row, third column third row, fourth column fifth row, and fifth column first row. Although there is no specific law for the arrangement mode 51 to set photo spacers PS, there is only one photo spacer PS in each column, and there is only one photo spacer PS in each row in sub-area units that can resolve disadvantages.

Figure 6:
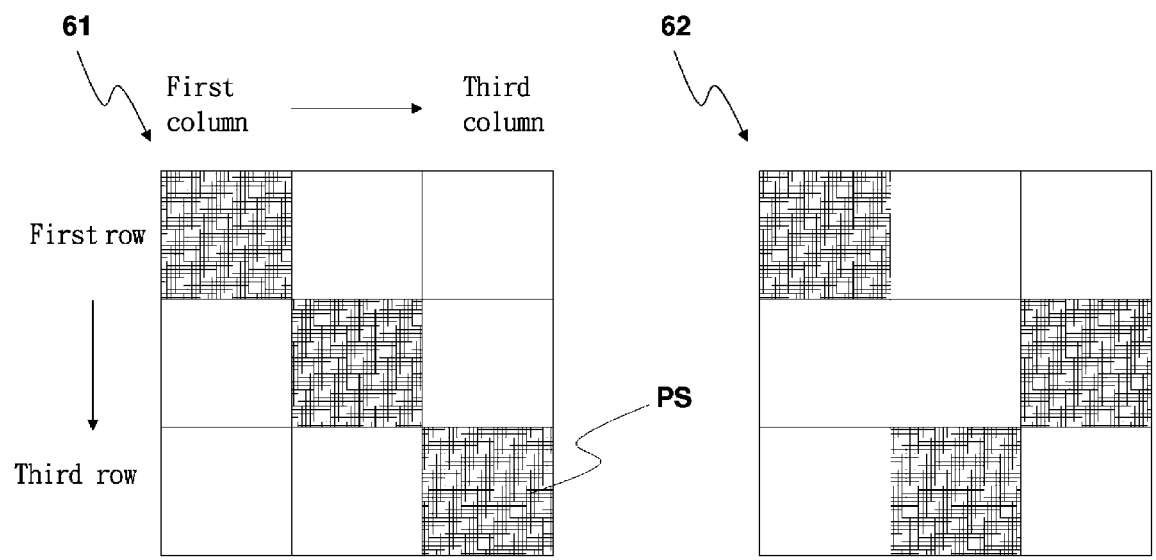
FIG. 6 is another schematic diagram of an example of an area unit of N=3 according to an embodiment of the present invention.

Referring to FIG. 6, another schematic diagram of an example of an area unit of N=3 according to an embodiment of the present invention is illustrated. An area unit of N=3 is to provide three photo spacers PS to set on the area unit. Meanwhile, a displacement parameter x can be provided by any corresponding integers to be co-prime with N and/or 1 that integers are also not greater than N. The displacement parameter x is to displace x column sub-area units. Therefore, the area unit of N=3 is to provide integers 1, 2 to be co-prime with 3 in order to be an displacement parameter x. The location of first column first row can be a first location for setting first photo spacer PS when an arrangement mode 61 of x=1 is selected. Second, a second location can be calculated that the first location is displaced vertically to the location of second row to be a start location. The start location at same row as the second row is displaced one column sub-area unit horizontally. The displaced location can be the second location for setting second photo spacer PS. Next, a third location can be calculated that the second location is displaced vertically to the location of third row to be a start location. The start location at third row is displaced one column sub-area unit horizontally. The displaced location can be the third location for setting last one photo spacer PS. Lastly, the setting location for setting photo spacer PS as the arrangement mode 61 can be obtained after calculating every row of the area unit. In addition, the location of first column first row can be a first location for setting first photo spacer 1 PS when an arrangement mode 62 of x=2 is selected. A second location can be calculated that the first location is displaced vertically to the location of second row to be a start position. The start location at same row as the second row is displaced two column sub-area units horizontally. The displaced location can be the second location for setting second photo spacer PS. Next, a third location can be calculated that the second location is displaced vertically to the location of third row to be a start location. The start location at third row is displaced two column sub-area units horizontally that horizontal displacement columns are greater than the same row as remaining columns of third row that continues to calculate from first column of third row. The displaced location can be the third location for setting last one photo spacer material PS. In other words, an n location can be calculated that an n−1 location is displaced vertically to n row to be a start location. The start location at same row is displaced x column sub-area unit horizontally to be the n location. The first column of same row can be calculated continuously if x column sub-area unit is greater than remaining columns of same row. Lastly, the setting location for setting photo spacer PS as the arrangement mode 62 can be made after calculating every row of the area unit.

Figure 7:
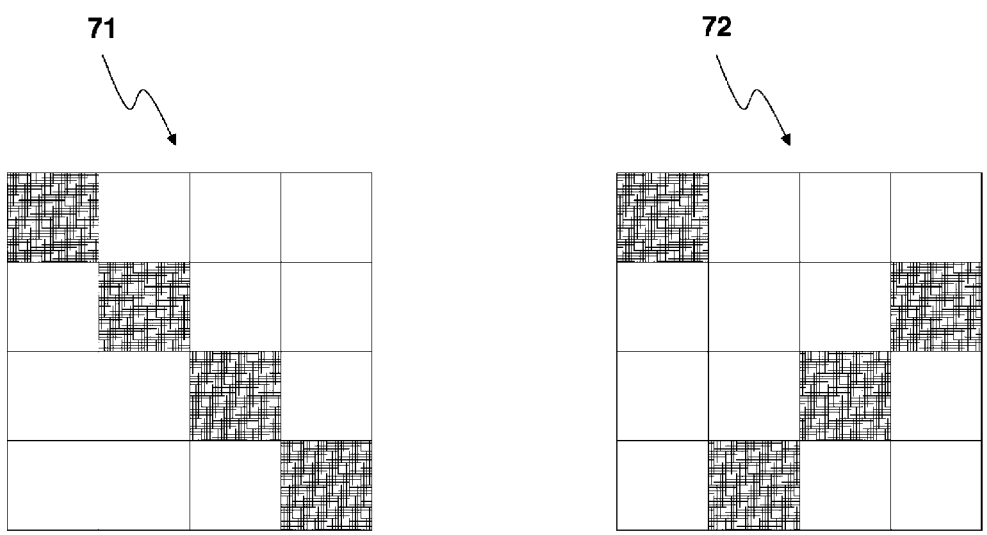
FIG. 7 is another schematic diagram of an example of an area unit of N=4 according to an embodiment of the present invention.

Referring to FIG. 7, another schematic diagram of an example of an area unit of N=4 according to an embodiment of the present invention is illustrated. An area unit of N=4 is to provide four photo spacers PS for setting on the area unit. Meanwhile, a displacement parameter x can be provided by integers 1, 3 to be co-prime with 4 at first and the following process can be illustrated as same as FIG. 6. The arrangement mode 71 is to take the displacement parameter x=1 for the setting location of each photo spacer PS and the arrangement mode 72 is to take the displacement parameter x=3 for the setting location of each photo spacer PS.

Figure 8:
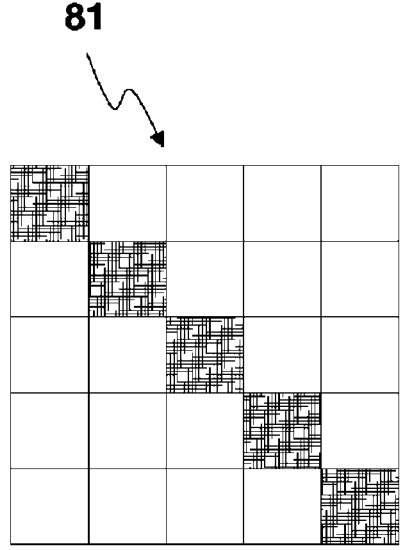
FIG. 8 is another schematic diagram of an example of an area unit of N=5 according to an embodiment of the present invention.
Figure 8:
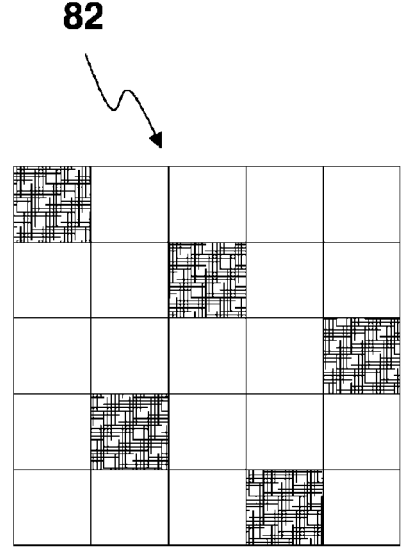
Figure 8:
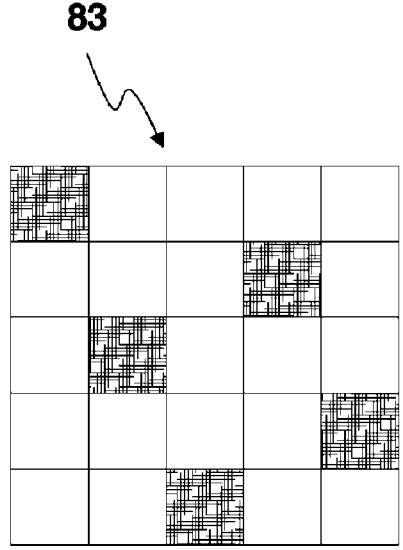
Figure 8:
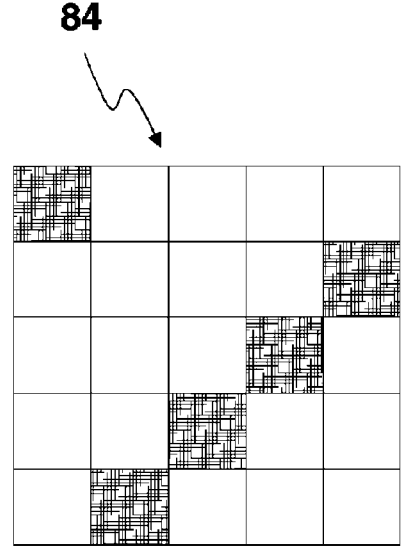

Referring to FIG. 8, another schematic diagram of an example of an area unit of N=5 according to an embodiment of the present invention is illustrated. An area unit of N=5 is to provide five photo spacers PS for setting on the area unit. Meanwhile, a displacement parameter x can be provided by integers 1, 2, 3, 4 to be co-prime with 5 at first and the following process can be illustrated as same as FIG. 6. The arrangement mode 81 is to take the displacement parameter x=1 for the setting location of each photo spacer PS. The arrangement mode 82 is to take the displacement parameter x=2 for the setting location of each photo spacer PS. The arrangement mode 83 is to take the displacement parameter x=3 for the setting location of each photo spacer PS. The arrangement mode 84 is to take the displacement parameter x=4 for the setting location of each photo spacer material PS.

Figure 9:
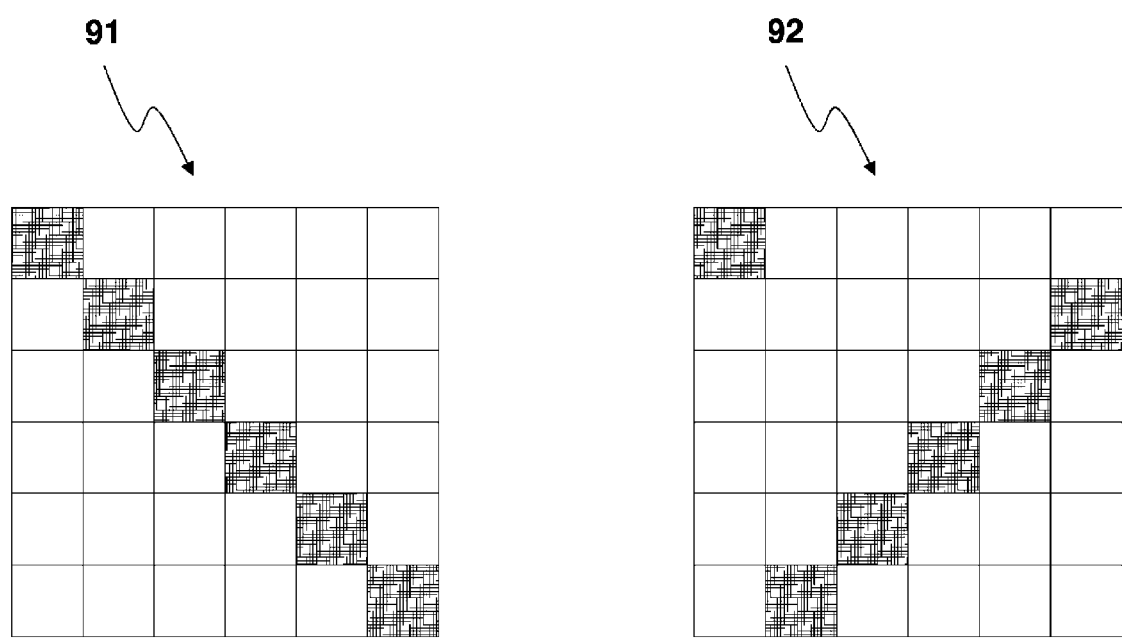
FIG. 9 is another schematic diagram of an example of an area unit of N=6 according to an embodiment of the present invention.

Referring to FIG. 9, another schematic diagram of an example of an area unit of N=6 according to an embodiment of the present invention is illustrated. An area unit of N=6 is to provide six photo spacers PS for setting on the area unit. Meanwhile, a displacement parameter x can be provided by integers 1, 5 to be co-prime with 6 and the following process can be illustrated as same as FIG. 6. The arrangement mode 91 is to take the displacement parameter x=1 for the setting location of each photo spacer PS and the arrangement mode 92 is to take the displacement parameter x=1 for the setting location of each photo spacer PS.

Figure 10:
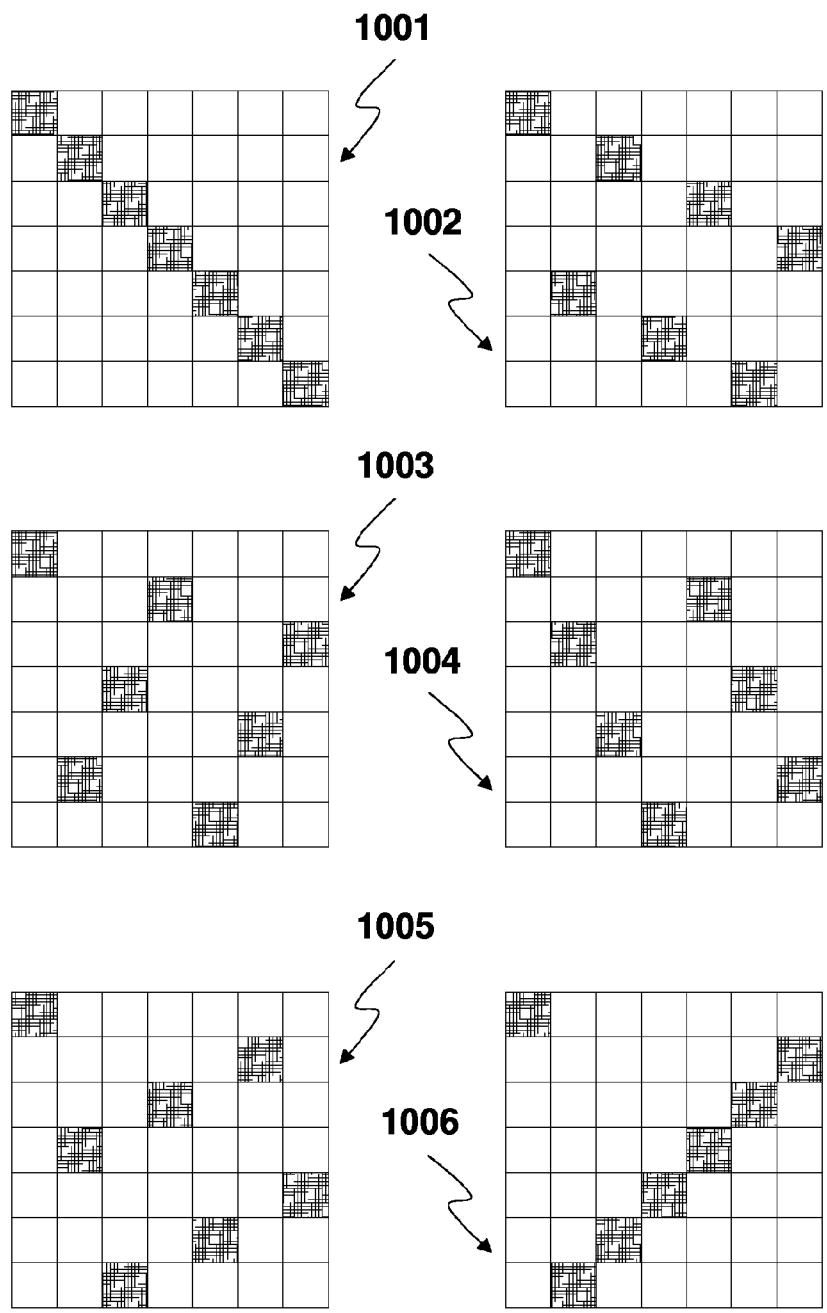
FIG. 10 is another schematic diagram of an example of an area unit of N=7 according to an embodiment of the present invention.

Referring to FIG. 10, another schematic diagram of an example of an area unit of N=7 according to an embodiment of the present invention is illustrated. An area unit of N=7 is to provide seven photo spacers PS for setting on the area unit. Meanwhile, a displacement parameter x can be provided by integers 1, 2, 3, 4, 5, 6 to be co-prime with 4 and the following process can be illustrated as same as FIG. 6. The arrangement mode 1001 is to take the displacement parameter x=1 for the setting location of each photo spacer PS. The arrangement mode 1002 is to take the displacement parameter x=2 for the setting location of each photo spacer PS. The arrangement mode 1003 is to take the displacement parameter x=3 for the setting location of each photo spacer PS. The arrangement mode 1004 is to take the displacement parameter x=4 for the setting location of each photo spacer PS. The arrangement mode 1005 is to take the displacement parameter x=5 for the setting location of each photo spacer PS. The arrangement mode 1006 is to take the displacement parameter x=6 for the setting location of each photo spacer PS.

Figure 11:
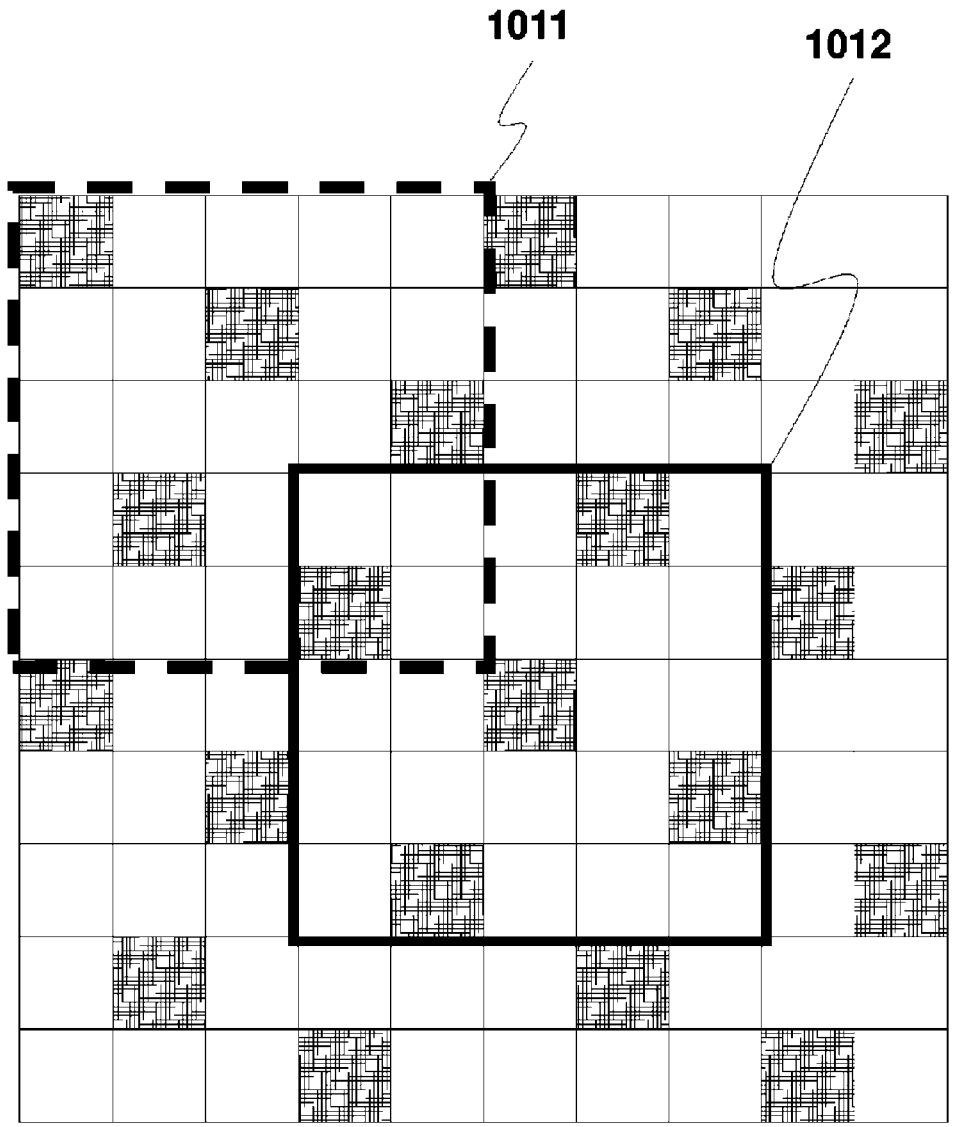
FIG. 11 is a schematic diagram of an example of an arrangement mode of allocating repeatedly at four quadrant locations according to FIG. 8.

Referring to FIG. 11, a schematic diagram of an example of an arrangement mode of allocating repeatedly at four quadrant locations according to FIG. 8 is illustrated. An area unit can be used to be the arrangement mode 82 in FIG. 8 as the dotted line box 1011 that is arranged repeatedly at four quadrant locations. A selection unit can be provided as the solid line box 1012 that is selected from the repeated four quadrant locations in order to be the arrangement mode of photo spacers. The scope of the selection unit equals the area unit of the arrangement mode 82. In order words, each photo spacer which is selected from the scope of the selection unit can be another method for arrangement if the selection unit is at the repeated four quadrant locations. Therefore, each method for arrangement from FIG. 5 to FIG. 10 can be accomplished through the process shown in FIG. 11 to obtain various arrangement modes for photo spacers.

By way of preferred embodiments of the mentioned above, each arrangement mode can be obtained by providing a method for arranging photo spacer. The method can be used in a flat panel apparatus for arranging repeatedly according to each arrangement mode that photo spacers can be filled on the panel.

In summation of the description above, the present invention is novel and useful and definite enhances the performance over the conventional structure and further complies with the patent application requirements and is submitted to the Patent and Trademark Office for review and granting of the commensurate patent rights.

What is claimed is:

1. A flat display apparatus comprising:
a panel having a plurality of substrates and P photo spacers,
wherein said P photo spacers are disposed in between said substrates providing a fixed distance between said substrates,
wherein said P photo spacers having two opposite sides, and both said two opposite sides directly contact said substrates,
wherein said P photo spacers having an arrangement that an area unit composed of N×N sub-area units with multiple columns and multiple rows, wherein $N^3 3$; and
in an arrangement mode, providing said P photo spacers uniformly distributed on said allocated area unit of the N×N sub-area units, wherein on substantially the entire allocated area unit composed of N×N sub-area units there is a single photo spacer in each column, and there is a single photo spacer in each row;
a displacement parameter x to be x column sub-area unit;
a first location, predetermining located in the first column, first row of the area unit;
a second location, displacing the first location to second row to be a start location, displacing the x column sub-area unit horizontally from the start location at same row to be the second location; and
an n location, displacing an n−1 location vertically to an n row to be a start location, displacing the x column sub-area unit horizontally from the start location at the same row to be an n location, wherein, if the x column sub-area unit is greater than remaining columns of the row, continuing said calculation from the first column of the row,
wherein the area unit repeatedly arranges at four quadrant locations and provides a selection unit of equaling the area unit, wherein the selection unit is selected from the repeated four quadrant locations in order to be the arrangement mode of the photo spacers.

2. The flat display apparatus of claim 1, wherein the area unit repeatedly allocates to fill on the panel.

3. The flat display apparatus of claim 1, wherein N and P are positive integers.

4. The flat display apparatus of claim 1, wherein N equals to P.

5. The flat display apparatus of claim 1, wherein the displacement parameter x is provided by any corresponding integers to be co-prime with N and/or 1, said integers being not greater than N.

6. The flat display apparatus of claim 1, wherein the selection unit are repeatedly arranged on the panel.

7. The flat display apparatus of claim 6, wherein N and P are positive integers.

8. The flat display apparatus of claim 7, wherein N equals P.

* * * * *